United States Patent
Sharma et al.

(10) Patent No.: US 10,751,703 B2
(45) Date of Patent: Aug. 25, 2020

(54) REFORMING CATALYST AND A PROCESS FOR PREPARATION THEREOF

(71) Applicant: Reliance Industries Limited, Mumbai (IN)

(72) Inventors: Nagesh Sharma, Vadodara (IN); Veera Venkata Satya Bhaskara Sita Rama Murthy Katravulapalli, Hyderabad (IN); Ajay Kumar, Vadodara (IN); Kalpana Gopalakrishnan, Vadodara (IN); Raksh Vir Jasra, Vadodara (IN)

(73) Assignee: Reliance Industries Limited, Mumbai (IN)

( * ) Notice: Subject to any disclaimer, the term of this patent is extended or adjusted under 35 U.S.C. 154(b) by 66 days.

(21) Appl. No.: 15/740,904

(22) PCT Filed: Jun. 30, 2016

(86) PCT No.: PCT/IB2016/053923
§ 371 (c)(1),
(2) Date: Dec. 29, 2017

(87) PCT Pub. No.: WO2017/002059
PCT Pub. Date: Jan. 5, 2017

(65) Prior Publication Data
US 2018/0193822 A1 Jul. 12, 2018

(30) Foreign Application Priority Data
Jun. 30, 2015 (IN) .......................... 390/MUM/2015

(51) Int. Cl.
*B01J 21/04* (2006.01)
*B01J 23/20* (2006.01)
(Continued)

(52) U.S. Cl.
CPC ........... *B01J 23/6567* (2013.01); *B01J 6/001* (2013.01); *B01J 21/04* (2013.01); *B01J 23/20* (2013.01);
(Continued)

(58) Field of Classification Search
CPC ... B01J 21/04; B01J 23/20; B01J 23/36; B01J 23/42; B01J 23/44; B01J 23/56;
(Continued)

(56) References Cited

U.S. PATENT DOCUMENTS 3,799,867 A 3/1974 Cardwell et al.
4,077,913 A * 3/1978 Acres .................... B01D 53/86
502/177

(Continued)

OTHER PUBLICATIONS

International Search Report issued in corresponding application No. PCT/IB2016/053923 dated Oct. 14, 2016 (2 pages).
(Continued)

*Primary Examiner* — Cam N. Nguyen
(74) *Attorney, Agent, or Firm* — Osha Liang LLP

(57) ABSTRACT

The present disclosure relates to a reforming catalyst and a process for preparing the same. The acidic functionality of the catalyst is suppressed by using a chloride free alumina and coating the chloride free alumina with Group V B metal oxide in the catalyst, which helps in minimizing the cracking reactions and achieving higher selectivity for liquid hydrocarbons and aromatic hydrocarbons.

16 Claims, 2 Drawing Sheets

(51) Int. Cl.

| | |
|---|---|
| *B01J 23/36* | (2006.01) |
| *B01J 23/42* | (2006.01) |
| *B01J 23/44* | (2006.01) |
| *B01J 23/56* | (2006.01) |
| *B01J 23/648* | (2006.01) |
| *B01J 23/656* | (2006.01) |
| *B01J 37/02* | (2006.01) |
| *B01J 37/08* | (2006.01) |
| *B01J 37/10* | (2006.01) |
| *B01J 37/20* | (2006.01) |
| *B01J 6/00* | (2006.01) |
| *C01B 3/40* | (2006.01) |
| *C10G 35/09* | (2006.01) |

(52) U.S. Cl.
CPC ....... *B01J 37/0203* (2013.01); *B01J 37/0207* (2013.01); *B01J 37/0236* (2013.01); *B01J 37/0242* (2013.01); *B01J 37/0244* (2013.01); *B01J 37/08* (2013.01); *B01J 37/10* (2013.01); *B01J 37/20* (2013.01); *C01B 3/40* (2013.01); *C01B 2203/1041* (2013.01); *C01B 2203/1082* (2013.01); *C10G 35/09* (2013.01)

(58) Field of Classification Search
CPC ................ B01J 23/6486; B01J 23/6567; B01J 37/0203; B01J 37/0207; B01J 36/0236; B01J 37/0242; B01J 37/0244; B01J 37/08; B01J 37/10; B01J 37/20; B01J 6/001; C01B 3/40

See application file for complete search history.

(56) References Cited

U.S. PATENT DOCUMENTS

| | | | | |
|---|---|---|---|---|
| 4,212,769 | A | | 7/1980 | Antos |
| 4,237,032 | A | * | 12/1980 | Evans ...................... B01J 23/54 423/213.5 |
| 4,492,770 | A | * | 1/1985 | Blanchard ............ B01D 53/945 423/213.5 |
| 5,856,263 | A | * | 1/1999 | Bhasin ................. B01D 53/945 502/333 |
| 6,417,135 | B1 | * | 7/2002 | Dyroff ..................... B01J 23/40 502/20 |
| 6,713,032 | B2 | * | 3/2004 | Mizobuchi ........... B01J 23/6567 423/247 |

OTHER PUBLICATIONS

Written Opinion of the International Searching Authority issued in corresponding application No. PCT/IB2016/053923 dated Oct. 14, 2016 (6 pages).

* cited by examiner

REFORMING CATALYST AND A PROCESS FOR PREPARATION THEREOF

FIELD

The present disclosure relates to a reforming catalyst and a process for preparing the same.

BACKGROUND

Catalytic reforming is an industrial process, which is used for improving the octane quality of naphtha. The feedstock used for catalytic reforming contains naphthenic hydrocarbons, paraffinic hydrocarbons and aromatic hydrocarbons with different carbon numbers. During reforming of naphtha, straight chain alkanes, with 6 to 10 carbon atoms, are reformed into molecules having the same number of carbon atoms, but, different structures. The conventional catalysts used for catalytic reforming process are bifunctional in nature, having the metallic functionality and the acidic functionality. The metallic functionality of the catalyst facilitates the dehydrogenation reaction and hydrogenation reactions.

The catalyst used for the catalytic reforming of naphtha consists of an active metal and optionally, a promoter metal dispersed on a gamma alumina support. The gamma alumina support is chlorided, which provides acidic functionality to the catalyst. The acidic functionality of the catalyst facilitates reactions, such as isomerization, dehydrocyclization and hydrocracking. The catalyst deactivates continuously during the reforming process, mainly due to coking. To counter the problem of coking the reaction temperature is increased gradually, so as to offset the loss of the catalytic activity. This leads to deterioration of the catalyst and it is not feasible to continue the reforming process with the same catalyst, thus, the catalyst requires regeneration.

Based on the frequency of regeneration, the commercial reformers can be broadly classified as semi-regenerative catalytic reformer, and continuous catalytic regenerative reformer. Fixed-bed reactors are used in the semi-regenerative process, whereas, the moving-bed reactors are used in the continuous reforming process.

Further, the catalyst used in the semi-regenerative is acidic due to the chlorided gamma alumina support resulting in reduction of the catalytic activity, catalyst stability, and yield of the desired products.

Hence, there is a need of a catalyst that overcomes the drawbacks associated with a conventional reforming catalyst.

OBJECTS

Some of the objects of the present disclosure, which at least one embodiment herein satisfies, are as follows:

An object of the present disclosure is to provide a catalyst for reforming of naphtha.

Another object of the present disclosure is to minimize the cracking reaction during the reforming process.

Still another object of the present disclosure is to improve the selectivity of liquid hydrocarbons.

Yet another object of the present disclosure is to reduce the coke formation on the catalyst during the reforming process.

Other objects and advantages of the present disclosure will be more apparent from the following description, which is not intended to limit the scope of the present disclosure.

SUMMARY

In accordance with one aspect of the present disclosure, there is provided a reforming catalyst comprising i) a chloride free alumina support and ii) a coating on the support, wherein the coating comprising at least one Group V B metal oxide in an amount in the range of 0.01 wt % to 0.5 wt %, at least one Group VII B metal in an amount in the range of 0.01 wt % to 0.5 wt % and at least one Group VIII B metal in an amount in the range of 0.01 wt % to 0.5 wt %.

In accordance with the embodiments of the present disclosure, the at least one Group V B metal oxide is selected from the group consisting of niobium (V) oxide, and tantalum (V) oxide.

In accordance with the embodiments of the present disclosure, the at least one Group VII B metal is rhenium (Re).

In accordance with the embodiments of the present disclosure, the at least one Group VIII B metal is selected from the group consisting of platinum (Pt), and palladium (Pd).

In accordance with another aspect of the present disclosure, there is provided a process for preparing a reforming catalyst, the process comprising the following steps: charging a vessel with a predetermined amount of a Group V B metal salt and an aqueous base while stirring to obtain a Group V B metal oxide gel; introducing a predetermined amount of chloride free alumina in the metal oxide gel to obtain a first mixture; heating the first mixture in an autoclave at a temperature in the range of 100 to 300° C. for a time period in the range of 20 to 100 hours to obtain a heated first mixture comprising a coated alumina support; separating the coated alumina support from the heated first mixture followed by drying and calcining to obtain a calcined coated alumina support; and impregnating the coating of the calcined coated alumina support with a Group VII B metal and a Group VIII B metal to obtain the reforming catalyst.

In accordance with the present disclosure, the impregnation step, performed during preparing the reforming catalyst comprises the following sub-steps: providing an aqueous solution of at least one Group VII B metal salt and an aqueous solution of at least one Group VIII B metal salt; mixing a predetermined amount of the aqueous solution of Group VII B metal salt, a predetermined amount of the aqueous solution of Group VIII B metal salt and a predetermined amount of conc. HCl to form a second mixture; immersing at least a portion of the calcined coated alumina support in the second mixture while stirring to form a dispersion comprising a supernatant liquid and a residue; and removing the supernatant liquid from the dispersion followed by drying the residue at a temperature in the range of 100 to 140° C. and calcining to obtain the reforming catalyst.

In accordance with the embodiments of the present disclosure, the at least one Group VII B metal salt is $HReO_4$ and the at least one Group VIII B metal salt is $H_2PtCl_6 \cdot (H_2O)_6$.

In accordance with the embodiments of the present disclosure, the calcination is carried out at a temperature in the range of 500° C. to 600° C. for a time period in the range of 4 to 15 hours.

In accordance with the embodiments of the present disclosure, the weight ratio of the amount of the calcined coated alumina support and the amount of the second mixture is 1:5.

In accordance with another aspect of the present disclosure, there is provided a process for preparing a reforming catalyst, the process comprising the following steps: A process for preparing a reforming catalyst, the process comprising the following steps: charging a vessel with a predetermined amount of group V B metal salt, a predetermined amount of an aqueous solution of Group VII B metal salt, a predetermined amount of an aqueous solution of Group VIII B metal salt and at least one fluid medium to obtain a mixture; introducing a predetermined amount of chloride free alumina in the mixture under stirring to obtain a slurry; terminating the stirring to obtain a dispersion comprising a supernatant liquid and a residue; and removing the supernatant liquid from the dispersion followed by drying the residue at a temperature in the range of 100 to 140° C. and calcining at a temperature in the range of 500° C. to 600° C. for a time period in the range of 4 to 15 hours to obtain the reforming catalyst.

In accordance with the embodiments of the present disclosure, the at least one fluid medium is selected from the group consisting of water, ethyl alcohol, n-butyl amine and tetrabutylammonium hydroxide.

In accordance with the embodiments of the present disclosure, the at least one Group V B metal oxide is selected from the group consisting of niobium (V) oxide and Tantalum (V) oxide; the at least one Group VII B metal salt is $HReO_4$ and the at least one Group VIII B metal salt is $H_2PtCl_6.(H_2O)_6$.

In accordance with the embodiments of the present disclosure, the at least one Group V B metal oxide, the at least one Group VII B metal and the at least one Group VIII B metal are each in an amount in the range of 0.01 wt % to 0.5 wt % of the reforming catalyst.

BRIEF DESCRIPTION OF THE ACCOMPANYING DRAWING

The process of the present disclosure will now be described with the help of the accompanying drawing, in which.

DETAILED DESCRIPTION

Figure 1:
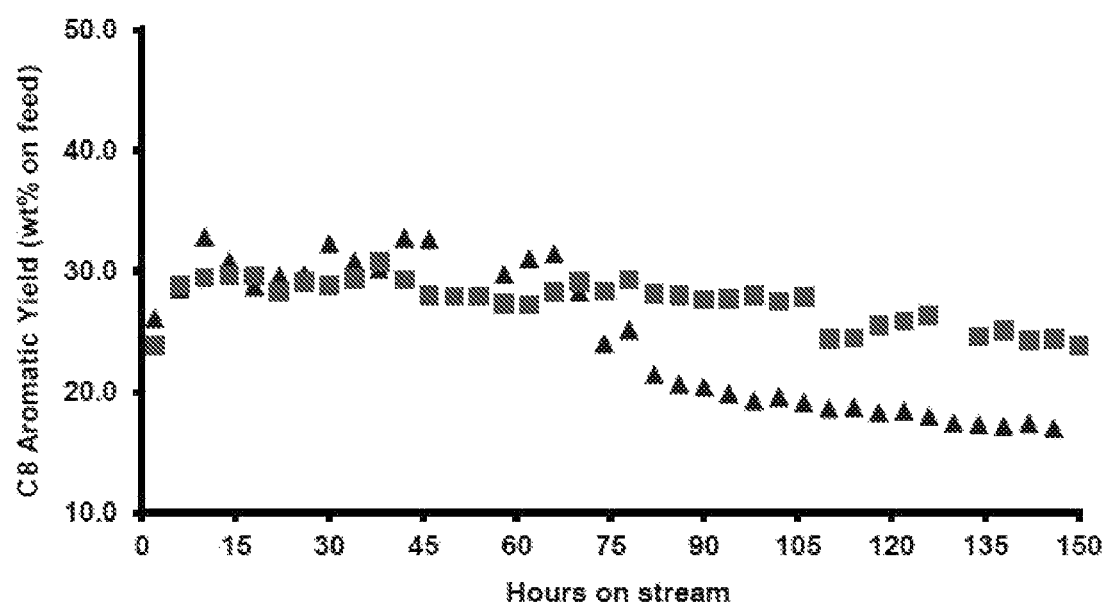
FIG. 1 illustrates the comparison of the yield of C8 aromatics obtained using the catalyst-1 (catalyst of the present disclosure) and the reference catalyst. (■=catalyst-1, and ▲=reference catalyst)

Conventional catalysts used for catalytic reforming of naphtha comprise an active metal and optionally a promoter metal dispersed on a gamma alumina support. Gamma alumina of the conventional catalyst is chlorided, which provide acidic functionality to the catalyst. The acidic functionality causes undesired side reactions such as isomerization, dehydrocyclization and hydrocracking. The conventional catalyst is deactivated continuously during the reforming process, mainly due to coking. Thus, the reaction temperature has to be increased gradually so as to offset the loss of the catalytic activity and this leads to deterioration of the conventional catalyst.

The present disclosure relates to a reforming catalyst for reforming of naphtha and a process for preparation thereof.

In accordance with one aspect of the present disclosure, there is provided a reforming catalyst, which comprises a chloride free alumina support and a coating on the support comprising at least one Group V B metal oxide in an amount in the range of 0.01 wt % to 0.5 wt %, at least one Group VII B metal in an amount in the range of 0.01 wt % to 0.5 wt % and at least one Group VIII B metal in an amount in the range of 0.01 wt % to 0.5 wt %.

The alumina support of the present disclosure is chloride free. Elimination of the chloride reduces the acidity of the catalyst, which improves the selectivity towards the liquid hydrocarbons and aromatics, and minimizes the coke formation In accordance with the embodiments of the present disclosure, the Group V B metal oxide is at least one selected from the group consisting of niobium (V) oxide, and tantalum (V) oxide.

In accordance with one embodiment of the present disclosure, the Group VII B metal is rhenium (Re).

The Group VIII B metal can be at least one selected from the group consisting of platinum (Pt) and palladium (Pd). In accordance with one embodiment of the present disclosure, the Group VIII B metal is platinum (Pt).

In accordance with one embodiment, the Group V B metal oxide coating can be in the form of nano-sheet on the alumina support, which is formed by the hydrothermal synthesis.

The reforming catalyst of the present disclosure minimizes cracking reactions by suppressing the acidic functionality of the catalyst. The acidic functionality of the catalyst is suppressed by using the chloride free alumina support, and Group V B metal oxide, which is coated onto the chloride free alumina support. Due to this, the cracking reactions are minimized, which results in improving the catalytic activity, catalyst stability, the selectivity of the liquid hydrocarbons, and the yield of aromatic hydrocarbons. The reforming catalyst of the present disclosure also minimizes coke formation on the catalyst during the reforming reaction.

In accordance with another aspect of the present disclosure, there is provided a process for preparing the reforming catalyst. The process comprises the steps, which are described herein below.

A vessel is charged with a predetermined amount of Group V B metal salt, typically metal halide and an aqueous base followed by stirring the content of the reactor to obtain a Group V B metal oxide gel. Predetermined amount of chloride free alumina is added to the gel under continuous stirring to obtain a first mixture. The first mixture is heated in an autoclave at a temperature in the range of 100 to 300° C. for a time period in the range of 20 to 100 hours to obtain a heated first mixture comprising a coated alumina support. The coated alumina support is separated from the heated first mixture followed by drying and calcining to obtain a calcined coated alumina support. The calcined coated alumina support is impregnated with a Group VII B metal and a Group VIII B metal to obtain the reforming catalyst.

In accordance with the present disclosure, the at least one Group V B metal oxide is at least one selected from the group consisting of niobium (V) oxide, and tantalum (V) oxide, the at least one Group VII B metal is rhenium (Re), and the at least one Group VIII B metal is selected from the group consisting of platinum (Pt), and palladium (Pd).

In accordance with the present disclosure, the amount of the at least one Group V B metal oxide, the at least one Group VII B metal, and the at least one Group VIII B metal are each in the range of 0.01 wt % to 0.5 wt % of the reforming catalyst.

In accordance with one embodiment of the present disclosure, the Group V B metal oxide is Niobium oxide.

In accordance with one embodiment of the present disclosure, the at least one Group VII B metal is rhenium.

In accordance with one embodiment of the present disclosure, the at least one group VIII B metal is platinum.

During the process of preparing the reforming catalyst of the present disclosure, the impregnating step comprises the sub-steps, which are described here.

a predetermined amount of an aqueous solution of Group VII B metal salt and a an aqueous solution of Group VIII B metal salt are mixed with a predetermined amount of conc. HCl to form a second mixture;

the calcined alumina support coated with Group V B metal oxide is immersed in the second mixture while stirring to form a dispersion comprising a supernatant liquid and a residue; and the supernatant liquid is removed from the dispersion followed by drying the residue at a temperature in the range of 100 to 140° C. followed by calcining to obtain the reforming catalyst.

In accordance with the embodiments of the present disclosure, the calcination step is carried out at a temperature in the range of 500° C. to 600° C. for a time period in the range of 4 to 15 hours.

In accordance with one embodiment of the present disclosure, the weight ratio of the amount of the calcined alumina support coated with Group V B metal oxide and the amount of the second mixture is 1:5.

In accordance with one embodiment, the at least one Group VII B metal salt is $HReO_4$. The concentration of Group VII B metal is in the range of 0.01 wt % to 0.5 wt % of the reforming catalyst.

In accordance with one embodiment, the at least one Group VIII B metal salt is $H_2PtCl_6.(H_2O)_6$. The concentration of Group VIII B metal is in the range of 0.01 wt % to 0.5 wt % of the reforming catalyst.

In accordance with one alternative embodiment, impregnation of Group VII B metal and Group VIII B metal can be done by at least one method selected from a group consisting of an equilibrium method, a pore volume method and incipient method.

In accordance with still another aspect of the present disclosure, the catalyst herein is used for a naphtha reforming process for improving the yield of aromatic compounds.

The yield of the C8 and total aromatic compounds using the catalyst-1 of the present disclosure is in the range of 25 wt % to 30 wt % and 50 wt % to 60 wt % respectively.

In accordance with yet another aspect of the present disclosure there is provided a process for preparing the reforming catalyst. In this process, a reactor is charged with a predetermined amount of Group V B metal oxide, a predetermined amount of an aqueous solution of Group VII B metal salt, a predetermined amount of an aqueous solution of Group VIII B metal salt and at least one fluid medium to obtain a mixture. A predetermined amount of chloride free alumina is introduced in the mixture under stirring to obtain a slurry. The stirring is terminated to obtain a dispersion comprising a supernatant liquid and a residue. The supernatant liquid is removed from the dispersion followed by drying the residue at a temperature in the range of 100 to 140° C. and calcining at a temperature in the range of 500° C. to 600° C. for a time period in the range of 4 to 15 hours to obtain the reforming catalyst.

In accordance with the embodiments of the present disclosure, the at least one fluid medium is selected from the group consisting of water, ethyl alcohol, n-butyl amine and tetrabutylammonium hydroxide.

The present disclosure is further described in light of the following experiments which are set forth for illustration purpose only and not to be construed for limiting the scope of the disclosure. The following experiments can be scaled up to industrial/commercial scale and the results obtained can be extrapolated to industrial scale.

Experiment 1: Preparation of Calcined Coated Alumina Support

A vessel was charged with 1 g of niobium chloride and 60 mL of aqueous ammonia solution under continuous stirring to obtain niobium oxide gel. 30 g extruded chloride free alumina was added to the gel to obtain a first mixture. The first mixture was heated at 180° C. for 48 hours under hydrothermal reaction conditions to obtain a heated first mixture comprising a coated alumina support. The coated alumina support was separated from the heated first mixture, which was dried at 120° C. for 12 hours and calcined at 540° C. to obtain a calcined coated modified alumina support.

Experiment 2: Impregnation of Calcined Coated Alumina Support 3.43 mL of $H_2PtCl_6.(H_2O)_6$ (concentration of Pt solution: 26.21 mg/mL) and 9.5 mL of $HReO_4$ aqueous solution (concentration of Re solution: 11.2 mg/ml) and 137.06 mL of water were mixed to obtain a second mixture. 30 g of calcined coated alumina support (as obtained in experiment 1) was added to the second mixture to obtain a slurry. The slurry was stirred for 12 hours at room temperature and allowed to stand to obtain a dispersion. Water was removed under reduced pressure on a rotary evaporator. The resultant residue was dried at 120° C. for 12 hours and calcined at 540° C. for 6 hours to obtain the reforming catalyst of the present disclosure.

Experiment 3: Alternative Process for Preparation of the Reforming Catalyst of the Present Disclosure A reactor was charged with 1 g of niobium chloride and was dissolved in 10 mL of ethyl alcohol under continuous stirring for 10 minutes to obtain a clear solution. In another reactor 3.43 mL of $H_2PtCl_6.(H_2O)_6$ (concentration of Pt solution: 26.21 mg/mL), 9.5 mL of HReO4 aqueous solution (concentration of Re solution: 11.2 mg/ml) and 127.06 mL of water were mixed to obtain solution of metal salts. To this solution of metal salts, the clear solution was added to obtain a mixture. 30 g $Al_2O_3$ was added to the mixture to obtain a slurry. The slurry containing alumina support was stirred for 12 hours at room temperature and kept steady to obtain a dispersion comprising supernatant water and a residue. Water was removed under reduced pressure on a rotary evaporator. The resultant residue was dried at 120° C. for 12 hours and calcined at 540° C. for 6 hours to obtain the reforming catalyst of the present disclosure.

Experiment 4: Reforming Reaction
Reduction and Presulphidation:

A reactor having an injection port on the top of reactor was charged with 40 g of the reforming catalyst (from experiment 1). The reactor was flushed with $N_2$ (with flow of 750 Normal Liters/hour/Litre catalyst) for 1 hour and was made leak proof at a pressure of 30 bar. Moisture was removed using a molecular sieve drier. The reactor was again flushed with $N_2$ (with flow of 750 NL/h/Lit catalyst) for 30 minutes. Hydrogen gas was introduced in the reactor to attain the pressure of 7 bar. The temperature of the reactor was increased to 300° C. and maintained for 48 hours; the temperature of the reactor was further increased to 460° C. and maintained for 48 hours; thereafter the temperature was increased to 480° C. and maintained for 24 hours. The reactor temperature was brought down to 440° C. at a rate of 35° C. per hour; further brought down to 371° C. (at the rate of 40° C. per hour) to obtain a reduced catalyst. The reactor pressure was maintained at 3 bar. Dimethyl disulphide (DMDS) (0.3 wt % of Sulphur) was injected in the reactor to obtain a sulphided catalyst. The reduced catalyst was further used for reforming reaction.

Activity Test:

The reforming reaction was carried out using naphtha feed over a fixed bed reactor containing the reforming catalyst as obtained in experiment 2 under the following reaction conditions:

$H_2$ pressure: 15 kg/cm$^2$,
$H_2$/HC mole ratio: 6,
LHSV: 2 h$^{-1}$, and
Temperature: 490-520° C., The performance of catalyst-1 was compared with the performance of the reference catalyst used conventionally.

It is evident from FIG. 1 that the Catalyst-1 exhibit higher catalyst activity and stability as compared to the reference catalyst (unmodified alumina support). As can be seen from FIG. 1, the activity of the catalyst-1 and the reference catalyst, towards C8 aromatics is similar up to 75 hours on stream, but the activity of the reference catalyst is seen to decrease after 75 hours, whereas the activity of catalyst-1 remain high as compared to the reference catalyst.

Figure 2:
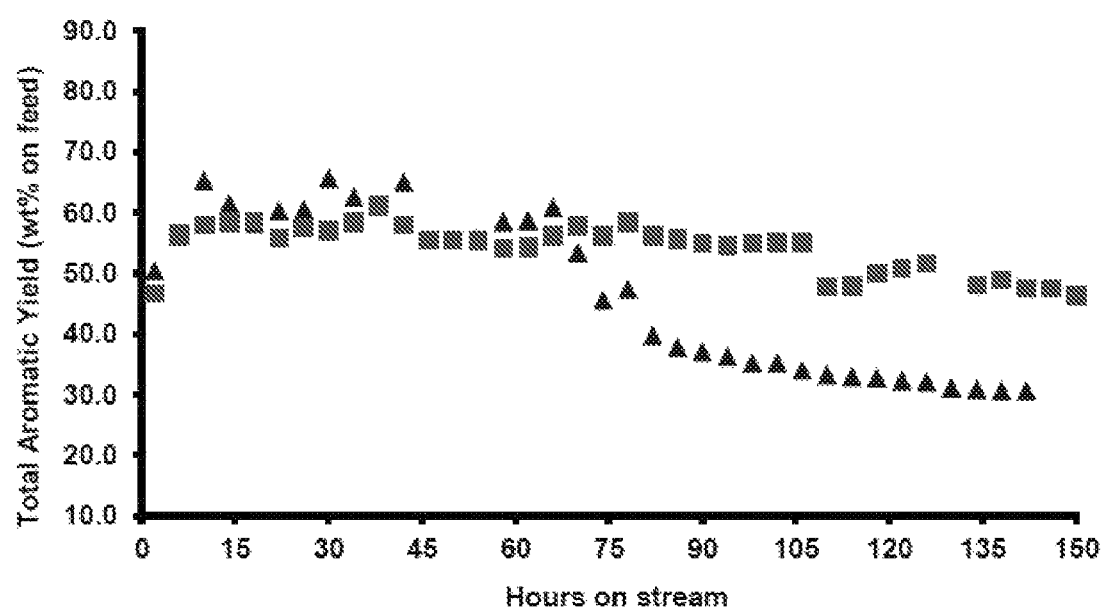
FIG. 2 illustrates the comparison of the yield of total aromatics obtained using the catalyst-1 (catalyst of the present disclosure) and the reference catalyst. (■=catalyst-1, and ▲=reference catalyst)

Similarly, it is evident from FIG. 2 that the catalyst-1 showed higher catalyst activity and stability as compared to the reference catalyst (unmodified alumina support). Activity of the catalyst-1 and the reference catalyst, towards total aromatics is similar up to 70 hours on stream, but the activity of the reference catalyst is seen to decrease after 70 hours, whereas the activity of catalyst-1 remain high as compared to reference catalyst.

Thus, it is evident that when Nb is used in the catalyst, the stability of the catalyst increases along with improved activity towards C8 aromatic and total aromatic yield. In case of the reference catalyst activity towards C8 aromatic yield and total aromatic yield decreased, whereas, when Nb is present in form of Nb coating on alumina support it controls the acidity of the catalyst, as result of which yield loss due to cracking is minimized and it improves the C8 aromatic and total aromatics yield in reformates.

Further, use of Niobium in coating has shown improvement in catalyst-1 stability, thereby reducing the coke formation as compared to that of the reference catalyst. The results are shown in Table 1.

TABLE 1

Analysis of coke on the spent catalyst

| Sample | % Coke per Kg of feed processed |
|---|---|
| Reference catalyst | 3.4 |
| Catalyst-1 | 1.4 |

Catalyst-1 shows better activity and stability in comparison with the reference catalyst.

Technical Advancements

The present disclosure described herein above has several technical advantages including, but not limited to, the realization of a reforming catalyst that:
is chloride free;
minimizes cracking reactions during reforming process;
has improved stability of the catalyst.
has improved yield of c8 and total aromatic compounds; and
reduces coke formation on the catalyst.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

The use of the expression "at least" or "at least one" suggests the use of one or more elements or ingredients or quantities, as the use may be in the embodiment of the invention to achieve one or more of the desired objects or results. While certain embodiments of the inventions have been described, these embodiments have been presented by way of example only, and are not intended to limit the scope of the inventions. Variations or modifications to the formulation of this invention, within the scope of the invention, may occur to those skilled in the art upon reviewing the disclosure herein. Such variations or modifications are well within the spirit of this invention.

The numerical values given for various physical parameters, dimensions and quantities are only approximate values and it is envisaged that the values higher than the numerical value assigned to the physical parameters, dimensions and quantities fall within the scope of the invention unless there is a statement in the specification to the contrary.

While considerable emphasis has been placed herein on the specific features of the preferred embodiment, it will be appreciated that many additional features can be added and that many changes can be made in the preferred embodiment without departing from the principles of the disclosure. These and other changes in the preferred embodiment of the disclosure will be apparent to those skilled in the art from the disclosure herein, whereby it is to be distinctly understood that the foregoing descriptive matter is to be interpreted merely as illustrative of the disclosure and not as a limitation.

The invention claimed is:

1. A reforming catalyst comprising
   i) a chloride-free alumina support; and
   ii) a coating on said support,
   wherein said coating comprising at least one Group V B metal oxide in an amount in the range of 0.01 wt % to 0.5 wt %, at least one Group VII B metal in an amount in the range of 0.01 wt % to 0.5 wt % and at least one Group VIII B metal in an amount in the range of 0.01 wt % to 0.5 wt %.

2. The catalyst as claimed in claim 1, wherein said at least one Group V B metal oxide is selected from the group consisting of niobium (V) oxide and tantalum (V) oxide.

3. The catalyst as claimed in claim 1, wherein said at least one Group VII B metal is rhenium (Re).

4. The catalyst as claimed in claim 1, wherein said at least one Group VIII B metal is selected from the group consisting of platinum (Pt) and palladium (Pd).

5. A process for preparing the reforming catalyst as claimed in claim 1, said process comprising the following steps:
   a) charging a vessel with a predetermined amount of a Group V B metal salt and an aqueous base while stirring to obtain a Group V B metal oxide gel;
   b) introducing a predetermined amount of chloride-free alumina in said metal oxide gel to obtain a first mixture;
   c) heating said first mixture at a temperature in the range of 100 to 300° C. for a time period in the range of 20 to 100 hours to obtain a heated first mixture comprising a coated alumina support;
   d) separating said coated alumina support from said heated first mixture followed by drying and calcining to obtain a calcined coated alumina support; and
   e) impregnating the coating of said calcined coated alumina support with a Group VII B metal and a Group VIII B metal to obtain the reforming catalyst.

6. The process as claimed in claim 5, wherein said at least one Group V B metal oxide is selected from the group consisting of niobium (V) oxide and tantalum (V) oxide; said at least one Group VII B metal is rhenium (Re); and said at least one Group VIII B metal is selected from the group consisting of platinum (Pt) and palladium (Pd).

7. The process as claimed in claim 5, wherein said at least one Group V B metal oxide, said at least one Group VII B metal and said at least one Group VIII B metal are each in an amount in the range of 0.01 wt % to 0.5 wt % of the reforming catalyst.

8. The process as claimed in claim 5, wherein said impregnation step (e) comprises the following sub-steps:
   i. providing an aqueous solution of at least one Group VII B metal salt and an aqueous solution of at least one Group VIII B metal salt;
   ii. mixing a predetermined amount of said aqueous solution of Group VII B metal salt, a predetermined amount of said aqueous solution of Group VIII B metal salt and a predetermined amount of concentrated HCl to form a second mixture;
   iii. immersing at least a portion of said calcined coated alumina support in said second mixture while stirring to form a first dispersion comprising a first supernatant liquid and a first residue; and
   iv. removing said first supernatant liquid from said dispersion followed by drying said first residue at a temperature in the range of 100 to 140° C. and calcining to obtain the reforming catalyst.

9. The process as claimed in claim 8, wherein said at least one Group VII B metal salt is $HReO_4$ and said at least one Group VIII B metal salt is $H_2PtCl_6.(H_2O)_6$.

10. The process as claimed in claim 8, wherein the ratio of the amount of the calcined coated alumina support and the amount of said second mixture is 1:5.

11. The process as claimed in claim 8, wherein said calcination step (iv) is carried out at a temperature in the range of 500° C. to 600° C. for a time period in the range of 4 to 15 hours.

12. The process as claimed in claim 5, wherein said calcination step (d) is carried out at a temperature in the range of 500° C. to 600° C. for a time period in the range of 4 to 15 hours.

13. A process for preparing the reforming catalyst as claimed in claim 1, said process comprising the following steps:
   i. charging a reactor with a predetermined amount of Group V B metal oxide, a predetermined amount of an aqueous solution of Group VII B metal salt, a predetermined amount of an aqueous solution of Group VIII B metal salt and at least one fluid medium to obtain a mixture;
   ii. introducing a predetermined amount of chloride-free alumina in said mixture under stirring to obtain a slurry;
   iii. terminating the stirring to obtain a dispersion comprising a supernatant liquid and a residue; and
   iv. removing said supernatant liquid from said dispersion followed by drying said residue at a temperature in the range of 100 to 140° C. and calcining at a temperature in the range of 500° C. to 600° C. for a time period in the range of 4 to 15 hours to obtain the reforming catalyst.

14. The process as claimed in claim 13, wherein said at least one fluid medium is selected from the group consisting of water, ethyl alcohol, n-butyl amine, and tetrabutylammonium hydroxide.

15. The process as claimed in claim 13, wherein said at least one Group V B metal oxide is selected from the group consisting of niobium (V) oxide and tantalum (V) oxide; said at least one Group VII B metal salt is $HReO_4$ and said at least one Group VIII B metal salt is $H_2PtCl_6.(H_2O)_6$.

16. The process as claimed in claim 13, wherein said at least one Group V B metal oxide, said at least one Group VII B metal and said at least one Group VIII B metal are each in an amount in the range of 0.01 wt % to 0.5 wt % of the reforming catalyst.

* * * * *